(12) United States Patent
Eriksson et al.

(10) Patent No.: US 6,665,282 B1
(45) Date of Patent: Dec. 16, 2003

(54) METHOD AND APPARATUS FOR CONFIGURING A RAKE RECEIVER

(75) Inventors: Håkan B. Eriksson, Lund (SE); Martin J. Jonson, Malmö (SE); Kenzo Urabe, Miyagi (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/204,359

(22) Filed: Dec. 4, 1998

(51) Int. Cl.[7] .................................................. H04Q 7/00
(52) U.S. Cl. ........................ 370/332; 370/335; 375/147; 375/148
(58) Field of Search ................................ 370/208, 209, 370/335, 342, 441, 465, 252, 332, 350; 375/140, 147, 148, 130, 267, 347, 144, 150, 227; 455/572, 574, 136, 296, 127.2

(56) References Cited

U.S. PATENT DOCUMENTS

| 5,109,390 | A | * | 4/1992 | Gilhousen et al. | .......... | 370/335 |
| 6,064,338 | A | * | 5/2000 | Kobayakawa et al. | ...... | 342/378 |
| 6,072,807 | A | * | 6/2000 | Daudelin | .................... | 370/252 |
| 6,097,972 | A | * | 8/2000 | Saints et al. | ................ | 455/115 |
| 6,229,842 | B1 | * | 5/2001 | Schulist et al. | ............. | 375/148 |
| 6,249,251 | B1 | * | 6/2001 | Chang et al. | ................ | 342/368 |

FOREIGN PATENT DOCUMENTS

| EP | 0 690 588 | 1/1996 |
| EP | 0 825 727 | 2/1998 |
| EP | 0 853 389 | 7/1998 |
| EP | 0 858 175 | 8/1998 |
| GB | 2 318 952 | 5/1998 |

* cited by examiner

Primary Examiner—Dang Ton
Assistant Examiner—Phuc Tran
(74) Attorney, Agent, or Firm—Burns, Doane, Swecker & Mathis, L.L.P.

(57) ABSTRACT

A first searcher searches a first channel (e.g., a broadcast channel), a second searcher searches a second channel (e.g., a traffic channel), and the second searcher uses information from the first searcher to search the second channel. In one aspect of the invention, the first searcher generates a delay profile for the first channel. A second searcher uses the delay profile to generate a set of taps for the second channel. In another aspect of the invention, the first searcher is configured to find a maximum correlation value (or a set of maximum correlation values). The second searcher shifts a search finger by an amount equal to the delay corresponding to the maximum correlation value(s). The second searcher can also shift a code corresponding to the second signal by an amount equal to the sum of the delay corresponding to the maximum correlation value(s) and a predetermined value.

35 Claims, 8 Drawing Sheets

METHOD AND APPARATUS FOR CONFIGURING A RAKE RECEIVER

BACKGROUND

The invention relates to receiving spread spectrum radio signals, such as digitally modulated signals in a Code Division Multiple Access (CDMA) mobile radio telephone system, and more particularly, to configuring a RAKE receiver.

Figure 1:
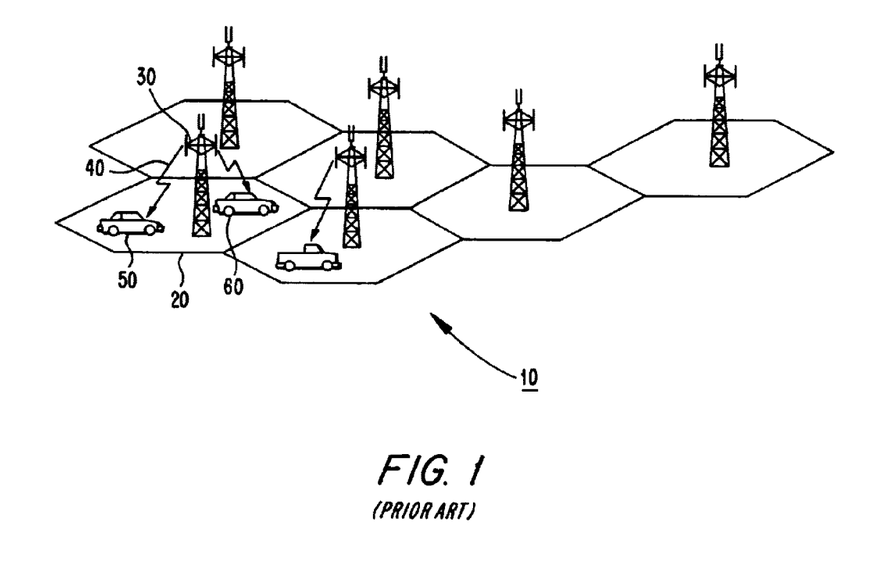
FIG. 1 illustrates the use of base stations to transmit radio waves to mobile users (mobile stations) in a cellular system.

FIG. 1 illustrates the use of base stations to transmit radio waves to mobile users (mobile stations) in a cellular system 10. Base station 30 transmits a signal 40 that has a maximum signal strength that is limited so as to reduce interference with other base stations. The maximum signal strength of the base station's transmission creates a foot print or a region within which mobile stations 50 and 60 can communicate with base station 30. If base station 30 uses a single omni-directional antenna, the foot print extends in an unlimited direction (360 degrees). While each footprint is an irregular shape that overlaps with adjacent foot prints, a foot print is often depicted as a hexagon 20 and is usually referred to as a cell.

In most systems, the base station 30 transmits a broadcast signal that is transmitted to all the mobile stations in cell 20. The mobile stations use different traffic signals, but the same broadcast channel. The broadcast signal contains, for example, paging messages that are needed by all the mobile stations in the cell. The base station can control the power of each traffic signal, but the broadcast signal has to be able to reach as far as the cell's border. Therefore, the broadcast channel usually contains more signal power than the individual traffic channels.

Figure 2:
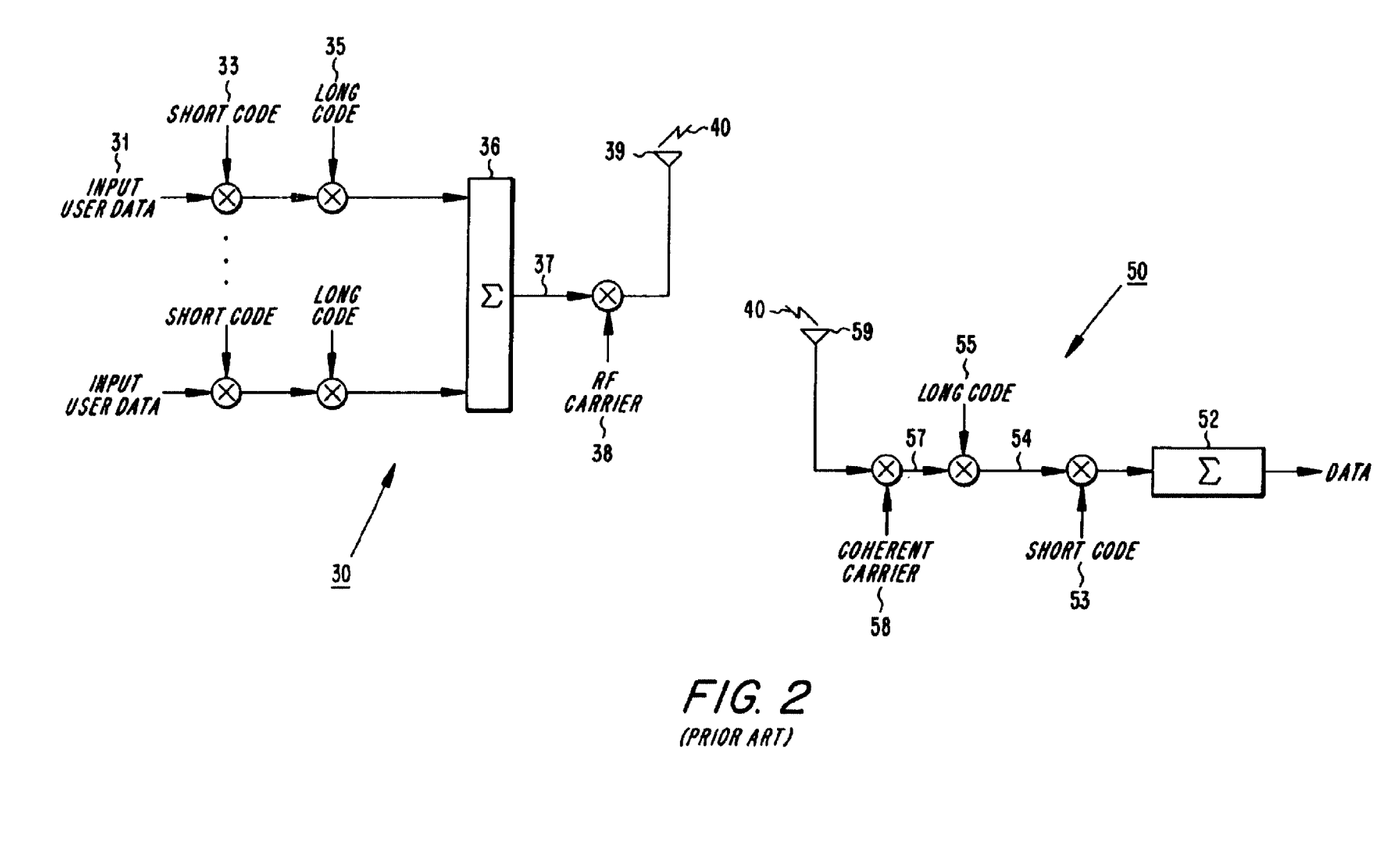
FIG. 2 is a schematic diagram of an exemplary CDMA system.

FIG. 2 is a schematic diagram of an example of a CDMA system. A transmitter 30 can transmit input user data to multiple users. In a traditional CDMA system, each symbol of input user data 31 is multiplied by a short code or chip sequence 33. There is a unique short code for each input user. Input user data is then spread by a long code or chip sequence 35. While the short codes eliminate multiple access interference among users in the same cell, the long code is used to eliminate multiple access interference among the transmitters. An accumulator 36 adds the spread signals to form a composite signal 37. Composite signal 37 is used to modulate a radio frequency carrier 38 which is transmitted by a transmitting antenna 39.

A receiver 50 has a receiving antenna 59 for receiving signal 40. Receiver 50 uses a carrier signal 58 to demodulate signal 40 and to obtain composite signal 58. Composite signal 57 is multiplied by a synchronized long code or chip sequence 55. Long code 55 is a locally generated complex conjugated replica of long code 35.

The despread signal 54 is then multiplied by a synchronized short code or chip sequence. Short code 53 is a locally generated complex conjugated replica of short code 33 (or one of the other N short codes used by transmitter 30). The multiplication by short code 53 suppresses the interference due to transmission to the other users. A digital logic circuit 52 (e.g., a summation and dump unit) can be used to provide an estimate of input user data 31.

It will be evident to those skilled in the art that receiver 50 can not reconstruct input user data 31 unless it can (1) determine long code 35 and synchronize a locally generated complex conjugated replica of long code 35 with the received signal 57, and (2) determine short code 33 and synchronize a locally generated complex conjugated replica of short code 33 with the despread signal 54. It is for this reason that many CDMA signals contain a pilot signal or a periodic code (synchronization code). The synchronization codes can be found by using a matched filter or a correlation scheme and by identifying the correlation peaks.

Figure 3:
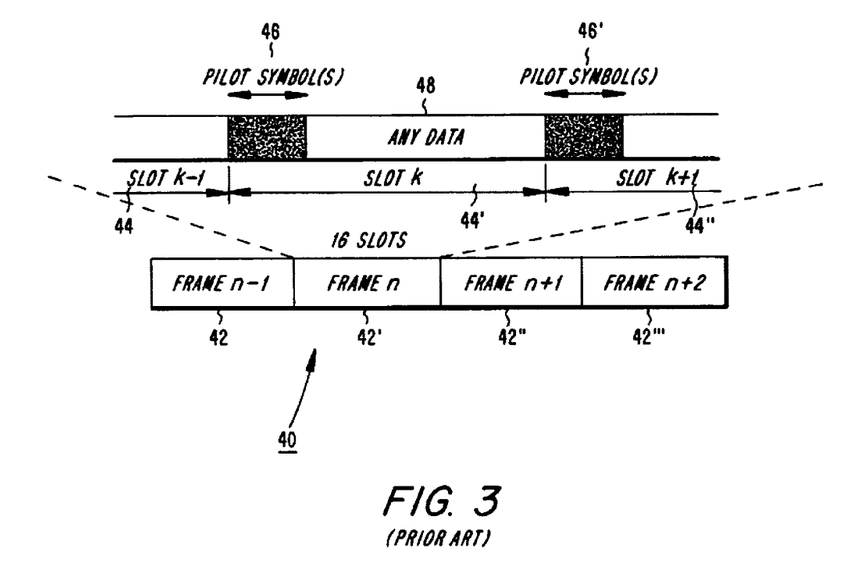
FIG. 3 is a schematic diagram of an exemplary frame structure.

FIG. 3 is a schematic diagram of an exemplary frame structure. Channel 40 has multiple frames 42. Each frame 42 has a constant number of slots 44. Each slot 44 contains one or more pilot symbol(s) 46. The long code 35 is repeated each frame so that, for example, the first pilot symbol in each frame is multiplied by the same portion of long code 35, and successive pilot symbols are multiplied by the same successive portions of long code 35. While the receiver can use the pilot signal to synchronize the received signal and search for multipath delays, in some systems, the pilot signal is a relatively small portion of each frame and does not contain much energy. A broadcast channel may use the same, or a different, frame structure. The broadcast channel may contain a pilot signal that is considerably longer. In either case, the broadcast channel usually contains more energy than a traffic channel.

Figure 4A:
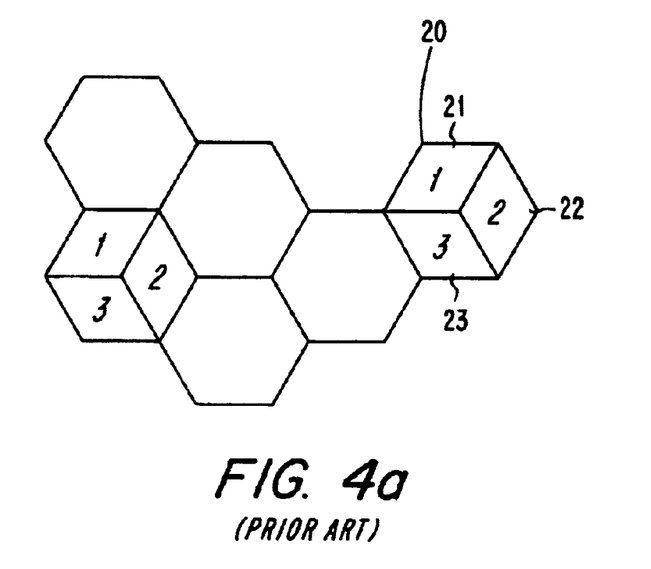
FIGS. 4a and 4b illustrate the use of directional antennas.
Figure 4B:
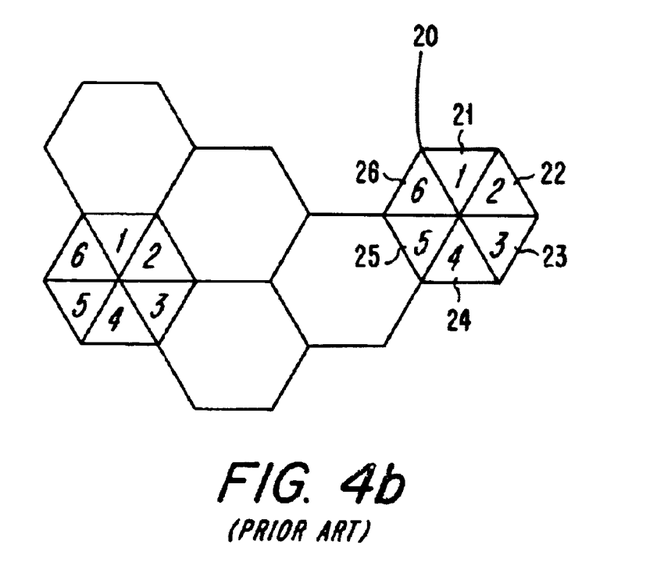

FIG. 4a illustrates the use of three directional antennas to divide a cell into three 120° sectors. Cell 20 has three sectors 21, 22, and 23. FIG. 4b illustrates the use of six directional antennas to divide a cell into six 60° sectors. Cell 20 has six sectors 21, 22, . . . , and 26. As discussed above, the long code 55 suppresses the interference due to other transmitters, and the short code 53 suppresses the interference due to other users. However, as the number of users increases so does the interference. In some systems, it is necessary to use directional antennas to subdivide each cell.

If base station 10 uses directional antennas, base station 10 can transmit multiple signals to smaller groups. When a base station uses directional antennas, each directional antenna transmits to a smaller number of mobile stations than a single antenna would. As a result, the amount of interference decreases and the base station can support a larger number of mobile stations without exceeding an acceptable level of interference noise. If each of the mobile stations uses the same broadcast channel, the base station can use an omnidirectional antenna to transmit the broadcast signal, and directional antennas to transmit the traffic signals.

In mobile communication systems, signals transmitted between base and mobile stations typically suffer from echo distortion or time dispersion (multipath delay). Multipath delay is caused by, for example, signal reflections from large buildings or nearby mountain ranges. The obstructions cause the signal to proceed to the receiver along not one, but many paths. The receiver receives a composite signal of multiple versions of the transmitted signal that have propagated along different paths (referred to as "rays"). The rays have different and randomly varying delays and amplitudes.

Each distinguishable "ray" has a certain relative time of arrival, $T_n$ seconds. A receiver can determine the relative time of arrival of each ray by using a matched filter, a search finger that is shifted, or any other correlation scheme. The output of the matched filter or the correlation scheme is usually referred to as the multipath profile (or the delay profile). Because the received signal contains multiple versions of the same signal, the delay profile contains more than one spike.

Figure 5:
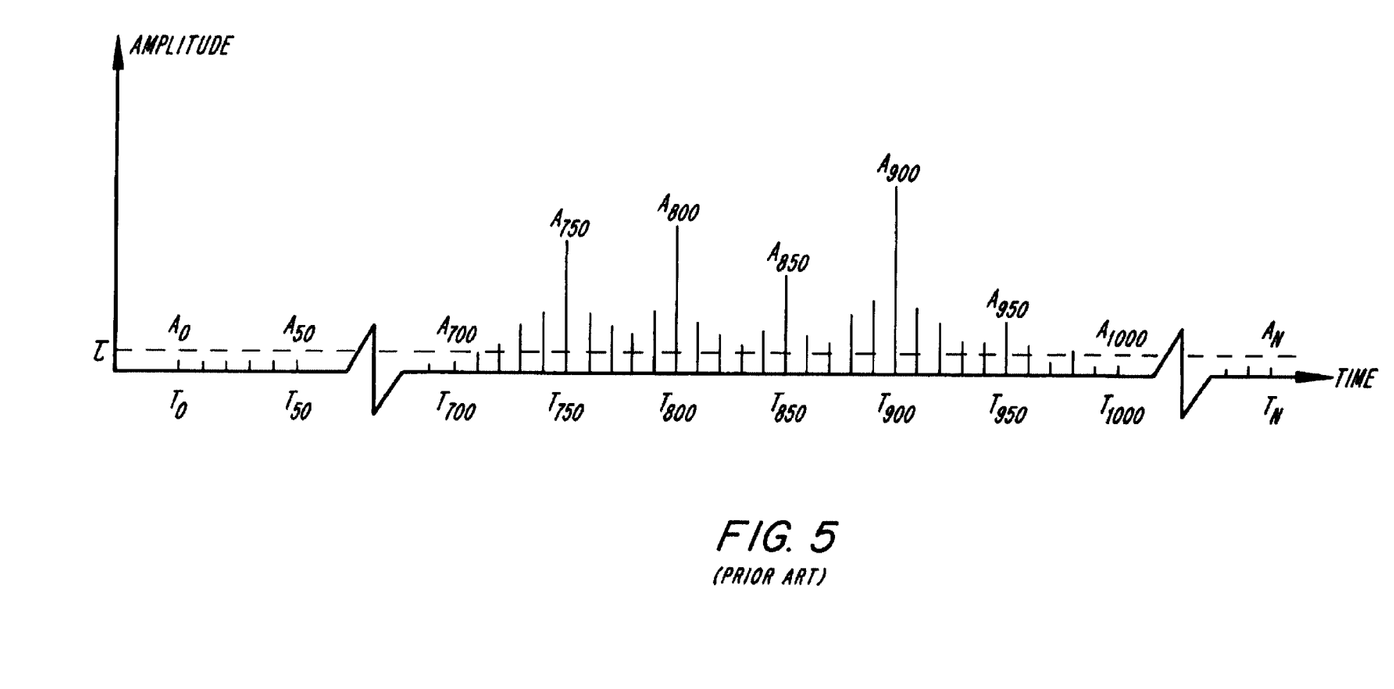
FIG. 5 is an example of multipath profile.

FIG. 5 is an example of a multipath profile. The ray that propagates along the shortest path arrives at time $T_o$ with amplitude $A_0$, and rays propagating along longer paths arrive at times $T_1, T_2, \ldots, T_N$ with amplitudes $A_1, A_2, \ldots, A_N$, respectively. In order to optimally detect the transmitted signal, the spikes must be combined in an appropriate way. This is usually done by a RAKE receiver, which is so named because it "rakes" different paths together. A RAKE receiver uses a form of diversity combining to collect the signal energy from the various received signal paths (or rays). The term "diversity" refers to the fact that a RAKE receiver uses redundant communication channels so that when some channels fade, communication is still possible over non-fading channels. A CDMA RAKE receiver combats fading by detecting the echo signals individually, and then adding them together coherently.

Figure 6:
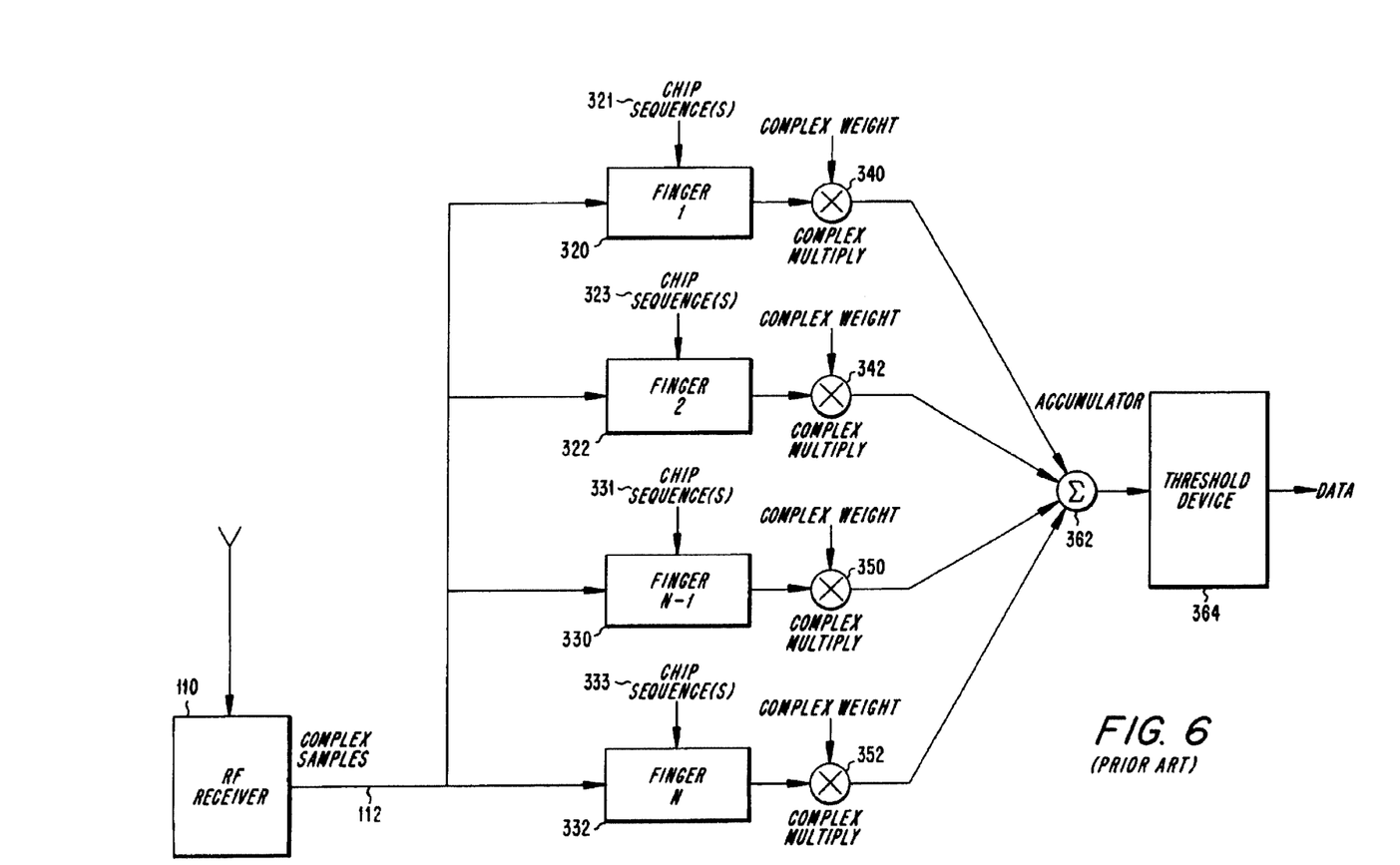
FIG. 6 is a schematic diagram of a RAKE receiver with four fingers.

FIG. 6 is a schematic diagram of a RAKE receiver with four fingers. A radio frequency (RF) receiver 110 demodulates a received signal and quantizes the demodulated signal to provide input signal 112. Each finger uses input signal 112 to recover signal power from a different path. The receiver can use a searcher to find a set of signal paths.

Using the example in FIG. 5, the searcher determines that the peak at $T_{900}$, has the greatest amplitude. Because this path is the strongest path, one of the fingers, for example, finger 320 is configured to receive a path having a delay of $T_{900}$. The receiver can be configured by, for example, delaying digital samples 112 by $T_{900}$, or by shifting chip sequence(s) 321 by an equivalent amount.

Similarly, input signal 112 can be correlated in finger 322 with a chip sequence 323 that has a phase corresponding to $T_{800}$; in finger 330 with a chip sequence 331 that has a phase corresponding to $T_{750}$; and in finger 322 with chip sequence (s) having a phase corresponding to $T_{850}$. The finger outputs are multiplied by individual weights 340, 342, 350, and 352 to maximize the received signal-to-noise-and-interference ratio. The weighted outputs are then added by an accumulator 362. The output of the accumulator 362 is fed to a threshold device 364, or to a quantizer that outputs soft information.

It is important that the RAKE receiver use the strongest taps (paths) for each finger. If the receiver does not use the strongest taps, the receiver will ask for more power and thereby increase the interference experienced by the other receivers. The overall interference is minimized when each of the receivers uses the least amount of power possible.

Using a searcher is costly and computationally complex. It is not only time-consuming, it also decreases the battery life of hand-held units. However, if the receiver does not find the strongest set of taps, the overall performance of the system will decline. Because the strength of the taps is important to the performance of the system, and the amount of search time is important to the performance of the receiver, there is a need for a RAKE receiver that can generate a strong set of taps in a shorter amount of time.

SUMMARY

These and other drawbacks, problems, and limitations of conventional RAKE receivers are overcome by obtaining information from a searcher that has searched a first channel, and using the information to search a second channel. In a preferred embodiment, a first searcher searches a broadcast channel, a second searcher searches a traffic channel, and the second searcher uses information from the first searcher to search the traffic channel. As a result, the second searcher can generate a strong set of taps for the traffic channel in a shorter amount of time. The searchers can use a matched filter, a search finger that is shifted, or any other correlation scheme.

According to one aspect of the invention, a first searcher generates a delay profile for a first channel (e.g., a broadcast channel), and a second searcher uses the. delay profile to generate a set of taps for a second channel (e.g., a traffic channel).

According to another aspect of the invention, a first searcher is configured to find a maximum correlation value (or a set of maximum correlation values), and a second searcher shifts a search finger by an amount equal to the delay corresponding to the maximum correlation value(s). The second searcher can also shift a search finger by an amount equal to the sum of the delay corresponding to the maximum correlation value(s) and a predetermined value.

According to another aspect of the invention, a first searcher is configured to find a maximum correlation value (or a set of maximum correlation values). A second searcher uses the maximum correlation value or values to generate a search window for a search finger or a matched filter.

According to another aspect of the invention, a first searcher is configured to generate a delay profile for a first signal and the second searcher uses a minimum threshold value to generate a search window for a search finger or a matched filter. The second searcher selects a start delay value and a finish delay value that correspond to correlation values exceeding the minimum threshold value. The searcher can search phases between the start delay value and the finish delay value.

According to another aspect of the invention, a second searcher is designed to determine whether to use information from a first searcher. The second searcher can make this decision by observing a delay profile found by the first searcher for a first channel and the delay profile found by the second searcher for a second channel. Or alternatively, the second searcher can make this decision by processing information from the source of the first channel.

An advantage of the invention is that the receiver can generate a strong set of taps in a shorter amount of time. Another advantage is that the receiver can receive signals sooner, and with fewer computations. Another advantage is that the battery life of hand-held units is increased.

The invention is particularly advantageous when the first signal is a broadcast channel, and the second signal is a traffic channel. Generally speaking, the broadcast channel contains more energy than the traffic channel, and the mobile station can find a better set of taps for the traffic channel in a shorter amount of time. In some cases, the broadcast channel is transmitted by a different antenna than the traffic channel. The mobile station can be configured to make a decision whether to use information from the broadcast channel to search the traffic channel.

BRIEF DESCRIPTION OF THE DRAWINGS

The foregoing, and other objects, features, and advantages of the invention will be more readily understood upon reading the following detailed description in conjunction with the drawings in which.

DETAILED DESCRIPTION

In the following description, specific details such as particular names for circuits, circuit components, and transmission techniques are discussed in order to provide a better understanding of the invention. However, it will be apparent to those skilled in the art that the invention can be practiced in other embodiments that depart from these specific details. In other instances, detailed descriptions of well-known methods and circuits are omitted so as not to obscure the description of the invention with unnecessary detail.

As discussed above, FIG. 1 illustrates the use of base stations to transmit radio waves to mobile users (mobile stations) in a cellular system; FIG. 2 is a schematic diagram of an exemplary CDMA system; FIG. 3 is a schematic diagram of an exemplary frame structure; FIGS. 4a and 4b illustrate the use of directional antennas; FIG. 5 is an example of a multipath profile; and FIG. 6 is a schematic diagram of a RAKE receiver with four fingers.

Figure 7:
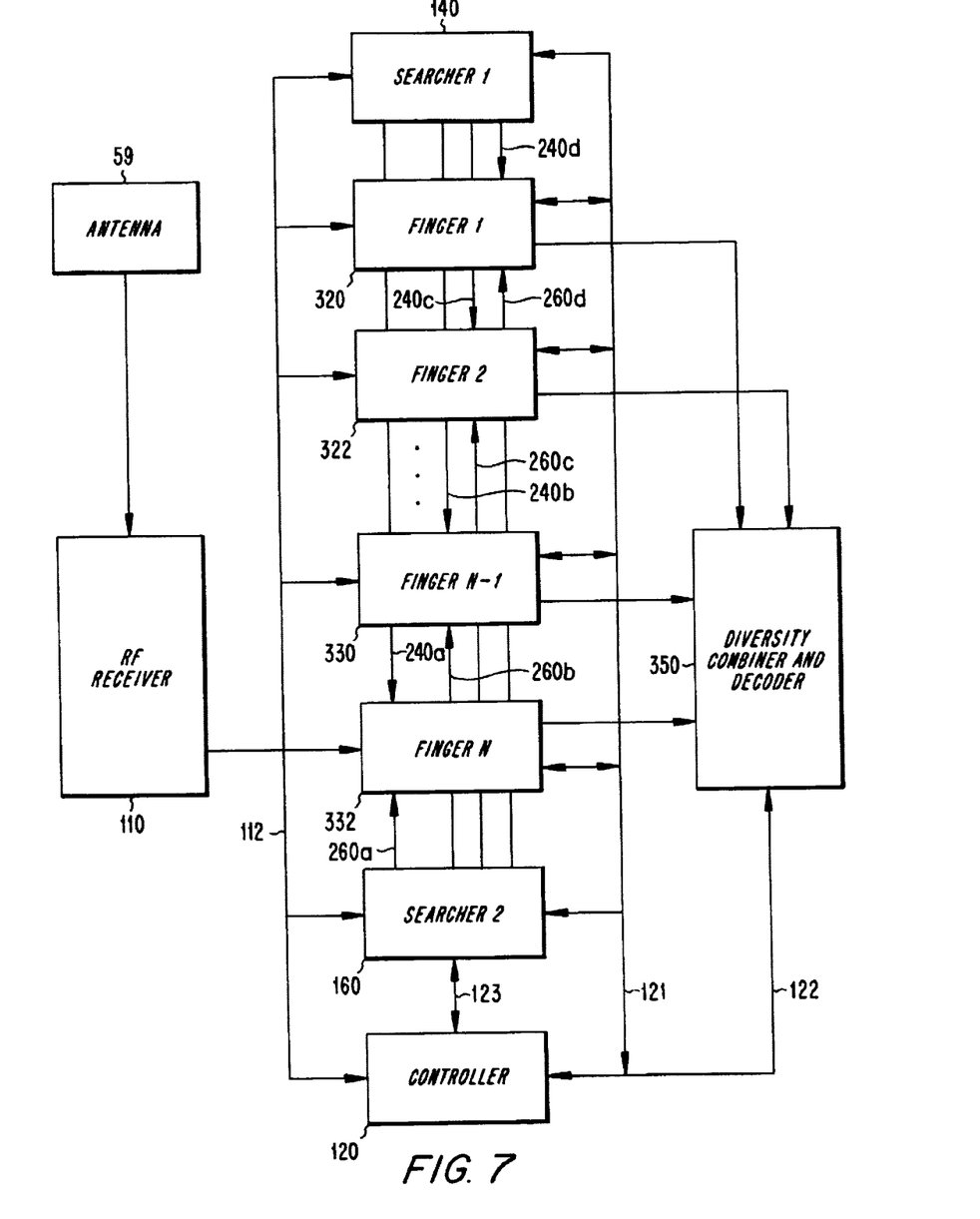
FIG. 7 is a schematic drawing of a searcher that uses information from a searcher that has searched a first channel to search a second channel.

FIG. 7 is a schematic drawing of a searcher that uses information from a searcher that has searched a first channel to search a second channel. An antenna 59 and a RF receiver 110 provide an input signal 112 to a controller 120 and a first searcher 140. The first searcher 140 can use a matched filter, a search finger, or any other correlation scheme to search input signal 112. The first searcher 140 can use the matched filter or the search finger to find a first set of correlation values corresponding to a first set of delays. It will be evident to those skilled in the art that the first searcher and the second searcher can be implemented using or share the same hardware or software.

In some situations, the first searcher 140 is used to configure a RAKE receiver. If, for example, the RAKE receiver has four fingers, the first searcher can select the four best taps 240a, 240b, 240c, and 240d, and provide these taps to fingers 320, 322, 330, and 332. The diversity combiner and decoder 350 can use the outputs of the four fingers 320, 322, 330, and 332 to recreate an estimate of the transmitted signal. In other situations, the receiver does not need to configure a RAKE receiver.

In either case, the first searcher searches the first channel, and a second searcher searches a second channel, and the second searcher uses information from the first searcher to search the second channel. If the mobile station needs to search the first channel, the second searcher might as well use information from the first searcher. However, in other cases, the first channel (e.g., a broadcast channel) contains more energy than the second channel (e.g., a traffic channel). When the first channel contains more energy than the second channel, the mobile station should search the first channel and use information from the first channel regardless of whether the mobile station needs to configure a RAKE receiver for the first channel.

The antenna 59 and the RF receiver 110 also provide an input signal 112 to a second searcher 160. Or alternatively, a second antenna and a second RF receiver (not shown) provide an input signal to the second searcher 160. The second searcher 160 is configured to generate a set of taps 260a, 260b, 260c, and 260d. The set of taps 260a, 260b, 260c, and 260d correspond to a second signal. The set of taps can be used to configure the same fingers or different fingers as the first searcher 140.

In some cases, the first channel and the second channel will be transmitted by the same antenna; in other cases they will not. If, for example, the first channel is a broadcast channel and the second channel is a traffic channel, the broadcast antenna is probably an omnidirectional antenna, and the traffic antenna could be a directional antenna.

The fact that the first channel and the second channel do not use the same antenna means that the multipath delays for the two signals will be different. However, if the antennas are in close proximity, the delays corresponding to the maximum amplitudes will be similar. In other words, the amplitudes can be very different, while the delays are relatively the same.

If, for example, the first searcher 140 searches input signal 112 to obtain the multipath profile shown in FIG. 5, it is not necessary for the second searcher 160 to search all N phase shifts of the second code. The second searcher can use information from the first searcher 140 to obtain a strong set of taps in a shorter amount of time.

According to one aspect of the invention, the first searcher 140 is configured to find a maximum correlation value or a set of maximum correlation values, and the second searcher 160 is configured to use the delay corresponding to the maximum correlation value (or the delays corresponding to the maximum correlation values) to generate the set of taps.

For example, the second searcher 160 can be configured to generate the set of taps by shifting a search finger an amount equal to the delay corresponding to the maximum correlation value. For example, if the delay corresponding to the maximum correlation value for the first signal is $T_{900}$, the second searcher can generate a tap by shifting a second code by $T_{900}$.

Or similarly, the second searcher 160 can be configured to generate the set of taps by shifting a search finger an amount equal to the sum of the delay corresponding to the maximum correlation value and a predetermined value. In other words, the second searcher 160 can generate a tap by shifting a second code by $t+T_{900}$. The predetermined value is used to account, for example, differences between the first signal antenna and the second signal antenna, or the frame location of the pilot signal. The second searcher 160 can generate the predetermined value by observing past outputs of the first searcher 140 and the second searcher 160.

According to another aspect of the invention, the second searcher 160 is configured to use the delay corresponding to the maximum correlation value (or delays corresponding to the maximum correlation values) to generate a search window for a matched filter or a search finger. For example, the second searcher 160 can form a search window around the delay corresponding to the maximum correlation value or a weighted average of the delays corresponding to the maximum correlation values. The second searcher 160 can generate a start delay value and a finish delay value and search only the phases between the start delay value and the finish delay value. For example, if the delay corresponding to the maximum correlation is $T_{900}$, the second searcher can search delays between $(T_{900}-a)$ and $(T_{900}+b)$ rather than all N phases, where the constants a and b are window length values.

According to another aspect of the invention, the second searcher 160 is configured to use a minimum threshold value to generate a search window. The second searcher 160 can use the minimum threshold value to select a start delay value and a finish delay value that exceed the minimum threshold value. The second searcher 160 can search the delay values between the start delay value and the finish delay value. For example, if the threshold is τ, the second searcher 160 can use τ to select a start delay value $T_{720}$ and a finish delay value $T_{980}$, and the second searcher 160 can search phases between $T_{720}$ and $T_{980}$ rather than all N phases.

Figure 8:
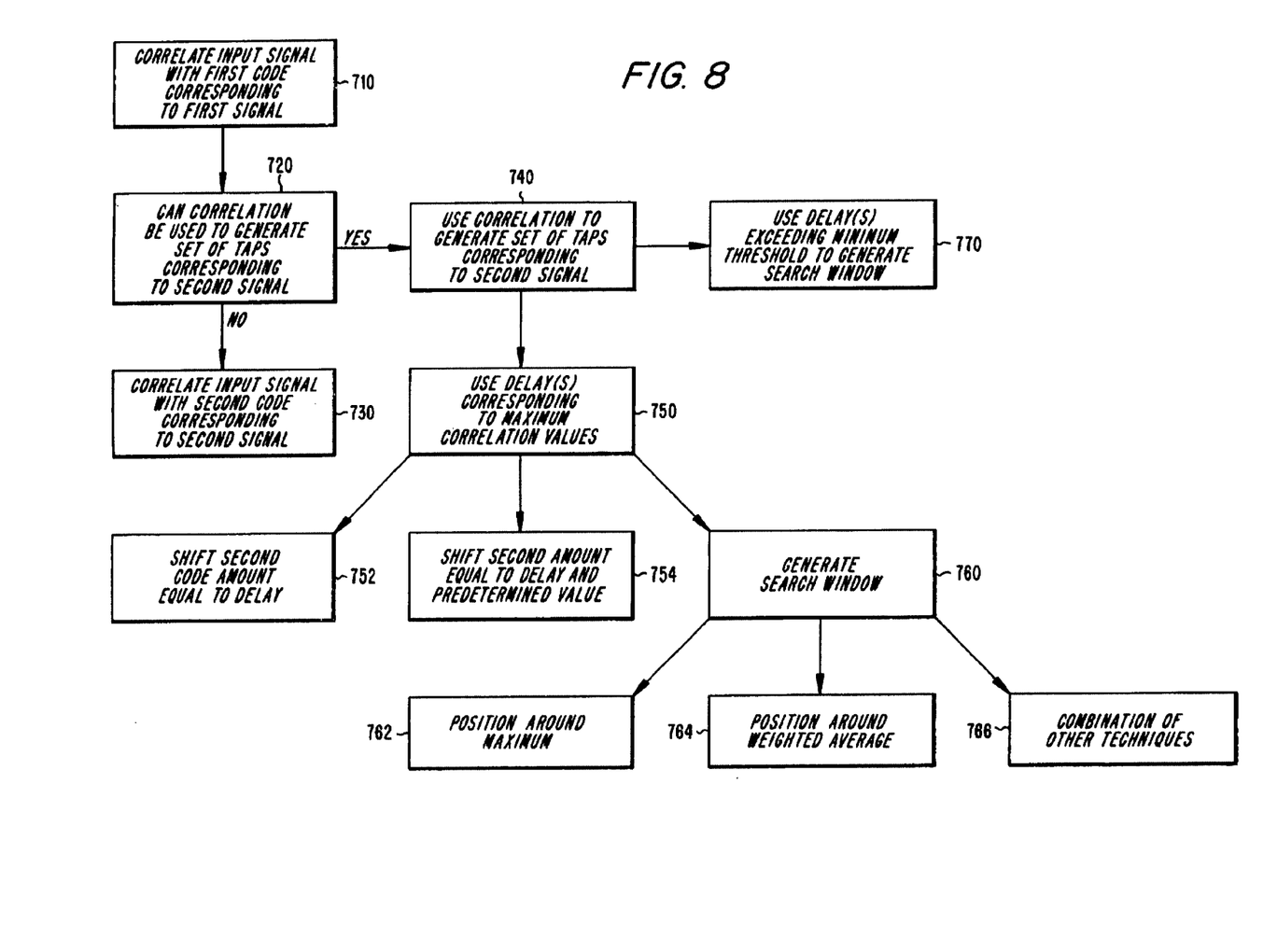
FIG. 8 is a flowchart of a method for finding a strong set of taps in a shorter amount of time.

FIG. 8 is a flowchart of a method for finding a strong set of taps in a shorter amount of time. In step 170, a first searcher correlates an input signal with a first code corresponding to a first channel. In step 720, a second searcher or a controller decides whether the correlation in step 710 can be used in step 740 to generate a set of taps for a second channel.

If the receiver cannot use the correlation in step 710, the receiver performs computation-complex step 730, and the second searcher correlates an input signal with a second code corresponding to the second channel.

If the receiver can use the correlation in step 710, the receiver performs step 740, and finds a stronger set of taps in a shorter amount of time. The receiver can use the correlation in step 710 in numerous different ways. While it is not possible to list every possible example, steps 750, 752, 754, 760, 762, 764, 766 and 770 are examples of how the receiver can use the correlation in step 710 to generate a set of taps for a second channel.

For example, in step 750, the receiver can use a delay corresponding to the maximum correlation value. In step 752, the receiver can use the delay corresponding to the maximum correlation value to shift a search finger. Or alternatively, in step 754, the receiver can shift a search finger by an amount equal to the sum of the delay and a predetermined value.

Or alternatively, in step 760, the receiver can generate a search window for a matched filter or a search finger. The receiver can position the search window around the delay corresponding to a maximum correlation value (step 762), around a weighted average of a set of maximum correlation values (step 764), or by using a combination of other techniques (step 766). And finally, in step 770, the receiver can use delays corresponding to correlation values exceeding a minimum threshold value to generate the search window.

While the foregoing description makes reference to particular illustrative embodiments, these examples should not be construed as limitations. Not only can the inventive system be modified for other transmission techniques; it can also be modified for other cellular systems. Thus, the present invention is not limited to the disclosed embodiments, but is to be accorded the widest scope consistent with the claims below.

What is claimed is:

1. An apparatus for configuring a RAKE receiver, the apparatus comprising:
   a first searcher, the first searcher configured to search one or more paths having different delays in a first channel;
   a second searcher, the second searcher configured to search one or more paths having different delays in a second channel, the second searcher configured to use information about delay times from the first searcher to search the second channel.

2. An apparatus as described in claim 1, the first searcher configured to generate a first set of correlation values corresponding to a first set of delays.

3. An apparatus as described in claim 2, the second searcher configured to use the first set of correlation values and the first set of delays to generate a set of taps for the second channel.

4. An apparatus as described in claim 3, the first searcher configured to find a maximum correlation value, the second searcher configured to use the delay corresponding to the maximum correlation value to generate at least one of the set of taps.

5. An apparatus as described in claim 1, wherein the first searcher does not need to configure a RAKE receiver for the first channel.

6. An apparatus as described in claim 1, wherein the second channel is transmitted by a different antenna than the first channel.

7. An apparatus as described in claim 6, wherein the first channel is transmitted by an omnidirectional antenna, and the second channel is transmitted by a directional antenna.

8. An apparatus for configuring a RAKE receiver, the apparatus comprising:
   a first searcher, the first searcher configured to search a first channel;
   a second searcher, the second searcher configured to search a second channel, the second searcher configured to use information from the first searcher to search the second channel,
   wherein:
     the first searcher is configured to generate a first set of correlation values corresponding to a first set of delays;
     the second searcher is configured to use the first set of correlation values and the first set of delays to generate a set of taps for the second channel;
     the first searcher is configured to find a maximum correlation value, the second searcher is configured to use the delay corresponding to the maximum correlation value to generate at least one of the set of taps; and
     the second searcher is configured to generate the at least one of the set of taps by shifting a search finger an amount equal to the delay corresponding to the maximum correlation value.

9. An apparatus as described in claim 8, wherein the first channel is a broadcast channel, and the second channel is a traffic channel.

10. An apparatus for configuring a RAKE receiver, the apparatus comprising:
    a first searcher, the first searcher configured to search a first channel;
    a second searcher, the second searcher configured to search a second channel, the second searcher configured to use information from the first searcher to search the second channel,
    wherein:
      the first searcher is configured to generate a first set of correlation values corresponding to a first set of delays;
      the second searcher is configured to use the first set of correlation values and the first set of delays to generate a set of taps for the second channel;
      the first searcher is configured to find a maximum correlation value, the second searcher is configured to use the delay corresponding to the maximum correlation value to generate at least one of the set of taps; and
      the second searcher is configured to generate the at least one of the set of taps by shifting a search finger an amount equal to the sum of the delay corresponding to the maximum correlation value and a predetermined value.

11. An apparatus as described in claim 10, the second searcher configured to use past outputs of the first searcher and the second searcher to generate the predetermined value.

12. An apparatus as described in claim 11, wherein the first channel is a broadcast channel, and the second channel is a traffic channel.

13. An apparatus for configuring a RAKE receiver, the apparatus comprising:
   a first searcher, the first searcher configured to search a first channel;
   a second searcher, the second searcher configured to search a second channel, the second searcher configured to use information from the first searcher to search the second channel,
   wherein:
      the first searcher is configured to generate a first set of correlation values corresponding to a first set of delays;
      the second searcher is configured to use the first set of correlation values and the first set of delays to generate a set of taps for the second channel;
      the first searcher is configured to find a maximum correlation value, the second searcher is configured to use the delay corresponding to the maximum correlation value to generate at least one of the set of taps; and
      the second searcher is configured to use the delay corresponding to the maximum correlation value to generate a search window, the search window comprising a start delay value and a finish delay value.

14. An apparatus as described in claim 13, the second searcher configured to use the delay corresponding to the maximum correlation value to generate the start delay value and the finish delay value.

15. An apparatus as described in claim 14, the second searcher configured to add a window length value to, the delay corresponding to the maximum correlation value to generate either the start delay value or the finish delay value.

16. An apparatus as described in claim 15, wherein the first channel is a broadcast channel, and the second channel is a traffic channel.

17. An apparatus for configuring a RAKE receiver, the apparatus comprising:
   a first searcher, the first searcher configured to search a first channel;
   a second searcher, the second searcher configured to search a second channel, the second searcher configured to use information from the first searcher to search the second channel,
   wherein:
      the first searcher is configured to generate a first set of correlation values corresponding to a first set of delays;
      the second searcher is configured to use the first set of correlation values and the first set of delays to generate a set of taps for the second channel; and
      the second searcher is configured to use the first set of correlation values and the first set of delays and a minimum threshold value to generate a search window, the search window comprising a start delay value and a finish delay value.

18. An apparatus as described in claim 17, the correlation value corresponding to the start delay value and the correlation value corresponding to the finish delay value exceeding the minimum threshold value.

19. An apparatus as described in claim 18, wherein the first channel is a broadcast channel, and the second channel is a traffic channel.

20. An apparatus for configuring a RAKE receiver, the apparatus comprising:
   a first searcher, the first searcher configured to search one or more paths having different delays in a first channel;
   a second searcher, the second searcher configured to search one or more paths having different delays in a second channel, the second searcher operable to use information about delay times from the first searcher to search the second channel; and
   the second searcher configured to make a decision whether to use information from the first searcher to search the second channel.

21. An apparatus as described in claim 20, the controller configured to use past outputs of the first searcher and past outputs of the second searcher to make the decision whether to use information from the first searcher to search the second channel.

22. An apparatus as described in claim 21, wherein the first channel is a broadcast channel, and the second channel is a traffic channel.

23. An apparatus as described in claim 20, the controller configured to use information transmitted by the source of the first channel to make the decision whether to use information from the first searcher to search the second channel.

24. An apparatus as described in claim 23, wherein the first channel is a broadcast channel, and the second channel is a traffic channel.

25. A method for configuring a RAKE receiver, the method comprising the steps of:
   searching one or more paths having different delays in a first channel;
   generating a delay profile for the first channel; and
   searching one or more paths having different delays in a second channel using information about delay times from the delay profile.

26. A method as described in claim 25, further comprising the step of finding a maximum correlation value for the first channel.

27. A method as described in claim 26, further comprising the step of generating a search window.

28. A method as described in claim 25, further comprising the step of generating a search window using a minimum threshold value.

29. A method as described in claim 25, further comprising the step of deciding whether the delay profile can be used to search the second channel.

30. A method as described in claim 29, the step of deciding whether the delay profile can be used to search the second channel comprising the step of observing past correlation values.

31. A method as described in claim 30, the step of deciding whether the delay profile can be used to search the second channel comprising the step of receiving information from the source of the first channel.

32. A method for configuring a RAKE receiver, the method comprising the steps of:
   searching a first channel;
   generating a delay profile for the first channel;
   searching a second channel using information from the delay profile;

finding a maximum correlation value for the first channel; and shifting a search finger an amount equal to the delay corresponding to the maximum correlation value.

33. A method for configuring a RAKE receiver, the method comprising the steps of:

searching a first channel;

generating a delay profile for the first channel;

searching a second channel using information from the delay profile;

finding a maximum correlation value for the first channel; and shifting a search finger an amount equal to the sum of the delay corresponding to the maximum correlation value and a predetermined value.

34. A method for configuring a RAKE receiver, the method comprising the steps of:

searching a first channel;

generating a delay profile for the first channel;

searching a second channel using information from the delay profile;

finding a maximum correlation value for the first channel;

generating a search window; and forming the search window around the delay corresponding to the maximum correlation value.

35. A method for configuring a RAKE receiver, the method comprising the steps of:

searching a first channel;

generating a delay profile for the first channel;

searching a second channel using information from the delay profile;

finding a maximum correlation value for the first channel;

generating a search window; and forming the search window around a weighted average of a set of delays corresponding to a set of maximum correlation values.

* * * * *